Patented May 24, 1938

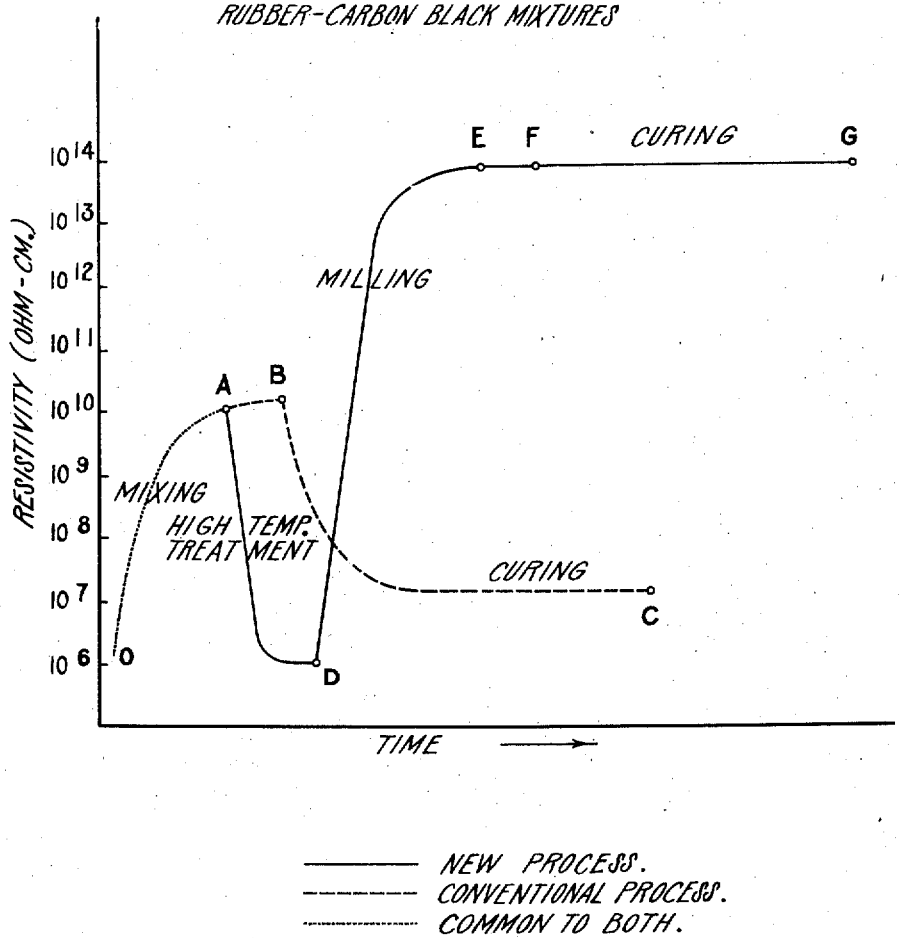

2,118,601

UNITED STATES PATENT OFFICE 2,118,601

MANUFACTURE OF RUBBER

Roscoe H. Gerke, Nutley, George H. Ganzhorn, West Englewood, and Louis H. Howland, Nutley, N. J., and Hugh M. Smallwood, New York, N. Y., assignors to United States Rubber Products, Inc., New York, N. Y., a corporation of Delaware Application September 14, 1935, Serial No. 40,534

20 Claims. (Cl. 106—23).

This invention relates to improvements in the technique of processing high carbon black-rubber mixes prior to vulcanization thereof, whereby to confer upon the rubber composition a desired sum total of physical and chemical properties.

Investigators of the behavior of carbon black in rubber have long sought to effect improvements in the physical properties of rubber-and-carbon black compositions through improving the degree of dispersion of the carbon black. They have found that the evidence points to the existence of a poorer degree of dispersion of the carbon black in the vulcanized composition than in the unvulcanized composition. It is likewise agreed that this is due to extensive flocculation of the carbon black during vulcanization. Efforts to prevent this flocculation during vulcanization and hence to improve the dispersion of the black in the vulcanized rubber have repeatedly met with failure. It has been predicted for many years that the eventual discovery of methods for obtaining better dispersion of carbon black in vulcanized rubber would result in the production of softer cured stocks having higher resistance to abrasion and in the use of tire treads having higher concentrations of carbon black.

These objects have now been accomplished by a discovery which is embodied in the present invention, by which it is now possible to produce tires, the tread portion of which shows an improvement in resistance to abrasion of 30% or more compared to the treads of tires which have heretofore been known to have the most resistance to abrasion, for example those of U. S. P. No. 1,984,247. There are also important improvements in various other desirable characteristics of the products. In the determination of these improvements in properties, various qualitative and quantitative methods were used to arrive at a comparison of products produced by the conventional methods with products produced according to the present invention. The results of these various tests show the following contrasting and differentiating characteristics between the usual product and the improved product.

| Usual product | Improved product |
|---|---|
| High resistance to abrasion | Higher resistance to abrasion |
| Hard | Relatively softer |
| High modulus | Relatively lower modulus at low elongation |
|  | Relatively higher modulus above 300% elongation |
| High hysteresis | Low hysteresis |
| Low electrical resistivity | High electrical resistivity |

Hardness values of tire treads containing 40 to 50% by weight of carbon black based on the rubber, according to the Adams densimeter, range from about 40 to about 50 or higher for the improved products and from less than 25 to about 35 for the products produced by the conventional and ordinary methods. By increasing the carbon black ratio up to from 60 to 70%, the hardness of the new product may be brought within the range of hardness of ordinary stocks. Such high amounts of carbon black cannot be successfully used in the ordinary methods of processing tread stocks but by this invention, such high amounts of carbon black can be successfully used when they are desired.

The modulus of the improved products ranges from 10 to 35 percent lower than that of similar products prepared by the usual methods, at elongations of less than about 200%. At elongations above about 300% and up to the point of rupture, the modulus of the new product is higher than that of the old product. The ultimate elongation of the new product is generally somewhat lower than that of the ordinary product, so that the tensile strength at rupture is usually slightly lower by an amount usually not exceeding about 10% of the tensile strength of the corresponding product produced by conventional methods.

The torsional hysteresis values of the new products range from about 0.035 to about 0.08 at 280° F., whereas the values of similar compounds, conventionally prepared, range from 0.12 to 0.25 and rarely as low as 0.10.

For vulcanizates containing 40 to 60 parts of carbon black per 100 parts of rubber, the new products show a specific electrical resistivity of at least $10^{11}$ ohm-centimeters and usually of at least $10^{12}$ ohm-centimeters, whereas conventional products range from less than $10^6$ to about $10^9$ ohm-centimeters, according to the type or brand of carbon black employed.

The new and useful properties of the compositions of the present invention are ascribed to the hereindisclosed method of heating and milling a rubber-carbon black mix under conditions whereby the carbon black is first severely flocculated and is thereafter deflocculated and rendered substantially particulately dispersed in the rubber, which state of dispersion is not materially disturbed by the subsequent vulcanizing operation. This condition of particulate dispersion does not refer to uniformity of distribution in the rubber nor to the absence of macroscopic lumps of unmixed carbon black, which are conditions obtainable by known methods of mixing and sometimes, for lack of a better term, called "good dispersion". It refers rather to the fact that the carbon black in the vulcanized product is dispersed, at least to a large extent, in the form of discrete particles of a size approaching or approximating the size of the ultimate particles, in which condition the particles are effectively isolated from each other. The actuality of this condition of the carbon black particles in the vulcanized rubber products of the invention follows from the extremely high electrical resistivity of the products, indicating that the carbon particles, which intrinsically are conductors of electricity, are electrically insulated from one another, and it follows also from the low hysteresis characteristics of the products, indicating comparative freedom from agglomerated carbon black particles in frictional contact with one another.

In contrast, the condition in ordinary high carbon black-rubber vulcanizates is that the carbon black is known to be present to a large extent in the form of agglomerates, each of which is made up of many mutually cohering particles, and/or in a flocculated state forming a net-work structure of filler particles having particle-to-particle contact throughout the rubber, (see Ind. Eng. Chem. 20, 1073-8, 1928). The friction between such aggregated particles, even though the agglomerates are sub-microscopic in size, accounts largely for the relatively high hysteresis characteristics of the ordinary high carbon black-rubber products; it is also known that the reinforcing and hardening effects of carbon black are related to the presence of such rigid structures. Furthermore, such structures provide continuous paths of relatively low resistivity for the conduction of electricity through the rubber. This so-called flocculation of carbon black is known to be induced by heat and the tendency to flocculate is more pronounced the finer the particle size of the carbon black. Tests of conventionally prepared vulcanizates, using for comparison various blacks ranging in average size from about 1 micron, which is characteristic of the relatively coarse, non-reinforcing or "soft" rubber blacks, down to values on the order of 0.01 micron or less which are characteristic of ultra-fine paint blacks and ink blacks, showed increases in the hardness, the electrical conductivity and the torsional hysteresis in the order of increasing fineness of the blacks, these conditions being indicative of increased flocculation in the same order.

More particularly, the new vulcanizates result from incorporating in the rubber a relatively large amount of carbon black, for example, at least 25 parts, and preferably at least 40 parts in the case of the tire treads, by weight of carbon black per 100 parts by weight of rubber, and then subjecting a homogeneous mixture of the ingredients to a heat treatment at a temperature substantially above 250° F., the preferred temperatures being in the range from about 300° F. to about 370° F. and masticating the mix during and/or after such heat treatment, or alternately therewith. The duration of the special heat treatment may vary with the temperature employed, the higher the temperature the shorter the time, and is governed also by the degree of change desired in the enumerated properties of the ultimate vulcanized product which properties are gauged to be compatible with its final use. In general, heat treatments of from 10 to 60 minutes duration will be found suitable for most purposes and particularly within the preferred temperature range. In practice it is difficult to maintain a uniform temperature throughout the batch and throughout the duration of the heat treatment because during milling the temperatures tend to rise by from 10 to 50°, the extent of the rise in temperature depending upon the duration of the milling, the efficiency of the cooling system, the size of the batch and other factors, but such rise in temperature is found to be beneficial so long as the temperature does not become too high. It is to be understood of course that the heat treatment is to be controlled within limits avoiding serious degradation of the rubber.

It has been observed that as the duration of the heat treatment at a given temperature is increased, the electrical resistivity and the hysteresis characteristics of the ultimate vulcanized products approach those of pure gum stocks, the resistance to abrasion goes through a pronounced maximum, and the modulus at elongations above 300% increases while the ultimate elongation, tensile strength and hardness undergo a gradual decrease.

The succession of fundamental processing steps of the method of the present invention may be represented as follows:

Conventional
1. Rubber breakdown
2. Homogeneous mixing with carbon black

Non-conventional
3. Hot milling or heater treatment preferably from about 300 to about 370° F. plus hot or cool milling to recovery of plastic properties Conventional
4. Completing incorporation of vulcanizing and other desired ingredients prior to shaping and vulcanization More particularly, with reference to the combination of masticating and heat treatment steps, these may be carried out concurrently, or the two steps may be carried out successively, or in alternation one or more times; for example, the heat treatment and the mastication may be effected concurrently by milling a pre-mixed homogeneous batch comprising carbon black and rubber on a very hot mill of either the external or the internal type, for example, a roll mill, a Banbury mixer or a Gordon plasticator, at a suitable temperature and for a suitable length of time as specified above, whereby the batch is first rendered considerably harder, and rough and dull in appearance. The recovery of the batch to the desired smooth plastic consistency will in some cases be accomplished during the continuation of the hot milling, and in other cases will require a further milling at lower temperatures. The hot milling is therefore best followed by a further milling on a relatively cool mill, that is, at ordinary milling temperatures, say between 100° and 200° F., for a few minutes or longer, preferably before the recipe is completed by the addition of the remaining desired ingredients. Alternatively, the heat treatment and the mastication may be effected successively by exposing a homogeneous mixture comprising carbon black and rubber to the required high temperature in a suitable heater, such as an oven, tank, or curing box containing a suitable heating fluid such as water, air, steam, nitrogen or the like, and subsequently, or in alternation with such heat treatment, milling the mixture for a short time.

The visible changes taking place during the special treatment are herewith to be described with reference to the hot-milling method. The mixture comprising rubber and carbon black, when well prepared by the usual methods, has a smooth, glossy, and homogeneous appearance, especially at a freshly cut surface, and has a viscosity such that it may easily be worked on the mill. After this mixture is transferred to another mill which has been pre-heated to 300° F., and worked, the surface of the batch becomes dull, dry and rough, the viscosity increases very markedly, and in the case of a roll mill the batch usually tends to lift from the rolls and to run through the nip without flow or without forming a bank. Then, as the hot-milling is continued, the batch begins to smooth out and become more plastic; finally, by the end of the hot milling period or during the subsequent milling at a lower temperature, the batch recovers its former glossy, homogeneous appearance, smooth milling qualities, softness, and normal viscosity. It will be noted, however, that the early stage and the later stage of the hot milling period are not necessarily sharply distinguished with respect to time, but may overlap, the changes characteristic of each stage sometimes tending to proceed simultaneously to a certain extent.

Paralleling these visible changes are very large changes in the electrical resistivity of the batch. The batch as initially prepared has a certain specific resistivity which depends principally upon the amount and type of carbon black employed and is found to be on the order of $10^9$ to $10^{12}$ ohm-centimeters for the proportions and types of black commonly used in tire treads. The stiffening which occurs after the batch is put on the hot mill is accompanied by a very large decrease in the resistivity, which falls to a value on the order of $10^6$ ohm-centimeters or less. Then, as the hot-milling continues and the batch becomes more and more plastic, the resistivity increases progressively and finally reaches a value greater than $10^{12}$ ohm-centimeters, for example a value on the order of $10^{14}$ or $10^{15}$ ohm-centimeters.

In the heater method the changes which take place while the batch is in the heater are similar to and correspond to the initial changes which occur on the hot mill in the hot-milling method; and, likewise, the milling following the heater treatment effects changes similar to those which characterize the recovery period in the hot-milling method.

The differences in the course of the conductivity changes during the processing of rubber-carbon black mixtures according to the invention and according to conventional procedure, respectively, are shown diagrammatically in the drawing. The specific electrical resistivity in ohm-centimeters is represented by a logarithmic scale on the vertical axis, and time on the horizontal axis without a definite scale. The dotted curve OA corresponds to the conventional mixing of the rubber and carbon black master batch (2:1), at the end of which the resistivity, as stated above, depends principally on the type of carbon black employed. Curve ABC is for the conventional procedure of mixing and curing; the portion AB shows the negligible increase in resistivity incident to the admixture of the further ingredients required to make the stock vulcanizable, and BC shows the fall in the resistivity to a substantially constant value during vulcanization, the resulting low resistivity being due to flocculation of the carbon black during vulcanization. Curve ADEFG is for the process of the present invention, the heating and milling being represented separately for convenience: AD shows the very rapid fall in resistivity, corresponding to a severe flocculation of the carbon black, which is effected by heating at high temperatures; DE shows the tremendous increase in resistivity, corresponding to the deflocculation and ultimate dispersion of the carbon black, during the recovery period of milling, a value closely approaching that of a pure gum stock being attained; and EF and FG, respectively, show the absence of any material change in the resistivity during admixture of the remaining ingredients and during vulcanization, corresponding to the retention of the non-flocculated particulate condition of the carbon black in the vulcanized rubber.

The choice of different types of carbon black results in resistivity curves essentially similar in shape to those of the drawing, the various points only being shifted more or less, vertically, according to differences in the fineness of the various carbon blacks.

Corresponding to the decrease in electrical conductivity of the batch during the hot milling (after the initial stage of high conductivity is passed) there is also a progressive change in the torsional hysteresis of vulcanized portions prepared from samples taken from the batch at successive intervals during the hot-milling, the hysteresis becoming lower and lower and finally reaching a value approximating or equalling that of a pure gum compound or of a compound loaded only with inert filler.

In the conventional process of mixing and milling carbon black-rubber batches to a smooth, homogeneous condition, the mill rolls are generally carefully maintained at relatively low temperatures, the cooling of the batches often being aided, so as to prevent scorching, by the addition of oils and similar softening agents and by cooling the mill when necessary. It will therefore be apparent that the high temperature treatment and recovery of the homogeneous batch comprising carbon black and rubber of the present invention, is a novel treatment which is supplementary to and distinct from the steps commonly practiced in the production of high carbon black-rubber products, particularly abrasion resisting products such as treads for tires.

The real nature or mechanism of the interaction between the rubber and the carbon black is not fully understood but tests show that heating of the rubber alone prior to admixture with the black is ineffective to produce the results of the invention. Neither are the results of the invention brought about by the heating incident to the vulcanization at high temperatures of conventionally prepared rubber compositions containing carbon black, because the flocculation of the carbon black which is effected by such heating is rendered fixed and irreversible by the vulcanization of the rubber and the consequent loss of its plastic properties. This explains the relatively high conductivity, hysteresis and hardness of the ordinary highly loaded carbon black vulcanizates.

On the contrary, in the present process, the severe flocculation attending the high temperature treatment is a reversible condition which is dissipated when the mixture is again made smoothly plastic by milling at high and/or low temperatures for a suitable length of time. Another view which may be taken is that the high temperature treatment has apparently effected a change in the rubber and/or the carbon black or possibly an interaction between the rubber and the carbon black, by virtue of which the carbon black is capable of being completely wetted by the rubber. Continued milling of the mixture during or after the high temperature treatment, then, results in the disintegration of carbon black aggregates into exceedingly fine particles and in the substantial elimination of particle-to-particle contacts, as evidenced by low hysteresis and low conductivity. Thus it is considered that this subsequent milling has broken up the carbon black aggregates into ultimate particles which have become dispersed throughout the rubber and are individually surrounded by rubber. Flocculation of the carbon black is now practically impossible, or at least is so retarded that the state of substantially complete discontinuity and dispersion of the carbon black phase is maintained throughout subsequent operations including vulcanization, and is preserved in the resulting vulcanizates.

Because the physical elements or units involved are below the limits of resolution of the microscope, microscopic methods cannot be used to follow the actual state of dispersion of the carbon black in the various stages. However, the low torsional hysteresis values and the high electrical resistivity values provide evidence of the state of unflocculated particulate dispersion of the black in the vulcanizates of the invention.

The invention is further specifically illustrated with respect to the processing of tire tread compositions, it being understood that such compositions before they are vulcanized are to be subjected to the usual steps of shaping, manipulation and mounting attendant the manufacture of a vehicle tire, whether of the solid or pneumatic variety, and in which the final article embodies at least as its tread portion, the vulcanized composition of the invention.

*Example 1.*—Hot milling method:

A carbon black master batch comprising 100 parts of smoked sheets and 45 parts of Cabot carbon black (by weight) was mixed in the conventional manner. Part of this master batch was then used to prepare two different vulcanizable stocks according to conventional procedure, by admixing therewith vulcanizing and other ingredients in suitable proportions, using two different accelerators for the two stocks. Another part of the black master batch was placed on a roll mill which had been pre-heated to about 300° F., and was milled for 30 minutes, during which the temperature of the rubber rose to about 340° F. Thereafter the batch was allowed to cool, and was then milled for 2 to 3 minutes at a roll temperature of about 100° F. until it reached a viscosity suitable for further compounding. This heat-treated master batch was then used to prepare two corresponding vulcanizable stocks by compounding in the same way as for the untreated master batch. The vulcanization accelerators used were typical of those widely used in tire treads. The complete recipes (parts are by weight) were:

|  | A | B |
|---|---|---|
| Rubber | 100 | 100 |
| Carbon black | 45 | 45 |
| Pine tar | 2.5 | 2.5 |
| Zinc soaps of cocoanut oil acids | 3 | 3 |
| Zinc oxide (Kadox) | 2 | 2 |
| Acetone-diphenylamine condensate (antioxidant) | 2 | 2 |
| Mercaptobenzothiazole | 1 | |
| Butyraldehyde-methylene-aniline condensate | | 0.75 |
| Sulfur | 2.625 | 4.0 |

The four resulting stocks were then cured in molds, at appropriate temperatures for the respective accelerators employed, the A stocks 60 minutes at 275° F., and the B stocks 90 minutes at 293° F. The physical properties of the resulting vulcanizates are compared in the following table (in which "Conv." and "H. T. M." indicate stocks prepared from the conventional and from the high-temperature-milled master batches, respectively):

|  | A (Thiazole accelerator) | | B (Aldehyde-amine accelerator) | |
|---|---|---|---|---|
|  | Conv. | H. T. M. | Conv. | H. T. M. |
| Log. R | 8.8 | >12 | 8.0 | >12 |
| Torsional hysteresis (280° F.) | 0.126 | 0.044 | 0.117 | 0.063 |
| Abrasion resistance (low speed) | 100 | 136 | 100 | 126 |
| Abrasion resistance (high speed) | 100 | 133 | 100 | 124 |
| Hardness (Adams densimeter) | 39 | 49 | 36 | 47 |
| Tensile strength (lbs./sq. in.) | 4367 | 4100 | 4050 | 3655 |
| Ultimate elongation, % | 620 | 510 | 570 | 510 |
| Permanent set (inches per inch) | 0.35 | 0.22 | 0.31 | 0.31 |
| Modulus (lbs./sq. in.) at elongation of 100% | 287 | 234 | 327 | 215 |
| 200% | 771 | 696 | 725 | 649 |
| 300% | 1457 | 1668 | 1357 | 1525 |
| 400% | 2350 | 2953 | 2222 | 2430 |
| 500% | 3413 | 3923 | 3355 | 3437 |

*Example 2.*—High temperature heater treatment:

Carbon black and smoked sheets were mixed in the usual manner on a 36-inch roll mill and sheeted out to a thickness of ¼ to ⅜ inch. One slab being retained as a control, the rest were heated in an atmosphere of steam for various lengths of time at temperatures of 316° and 338° F. (158° and 170° C.). The heated slabs were found to be hard and of low resistivity. They were then plasticized by running on a cool mill for 2 or 3 minutes, whereupon the resistivity was found to have increased by a factor of one hundred or more. Vulcanizing and other ingredients were then added to each batch, including the unheated control, in the following proportions per 100 parts of rubber by weight:

Pine tar _____ 2
Zinc soaps of cocoanut oil acids _____ 2.5
Zinc oxide _____ 1
Acetone-diphenylamine condensate _____ 1
Butyraldehyde-methylene-aniline condensate _____ 0.75
Sulfur _____ 4

Press cures of each mix were made at 293° F. Mooney plastometer (Ind. and Eng. Chem. Anal. ed. vol. 6, p. 147, March 1934); resistivity measurements were made on the recovered batches, and also on samples of the same after they had been heated in cavity molds for a period of 30 minutes at 293° F. Vulcanizable stocks were prepared from each hot-milled and recovered batch, and also from an untreated control portion of the original master batch, using the same recipe as for the thiazole stock in Example 1, and were cured at 274° F. Physical tests on the raw and the vulcanized specimens are summarized in the following table.

|  | Conventional | H. T. M. | | | |
|---|---|---|---|---|---|
| Time of high-temp. milling (minutes) | 0 | 30 | 60 | 90 | 120 |
| Temp. of bank (°F.) |  | 325-355 | 340-355 | 345-358 | 338-355 |
| Plasticity (Mooney): |  |  |  |  |  |
| Before recovery | (129.5) | 113.5 | 54.5 | 44 | 40.0 |
| After recovery |  | 59.5 | 43.0 | 38 | 35.5 |
| Log R of recovered batch: |  |  |  |  |  |
| Before further heating | 8.8 | >12 | >12 | >12 | >12 |
| After 30 min. heating | 7.2 | >12 | >12 | >12 | >12 |
| Vulcanizates — Minutes cure |  |  |  |  |  |
| Log R  30 | 7.1 | >12 | >12 | >12 | >12 |
| 60 | 6.8 |  |  |  |  |
| 90 | 6.6 |  |  |  |  |
| Torsional hysteresis at 280° F.  30 | .149 | .076 | .067 | .067 | .067 |
| 60 | .140 | .063 | .051 | .049 | .049 |
| 90 | .141 | .061 | .050 | .046 | .047 |
| Abrasion resistance (low speed)  30 | 100 | 144 | —(Too soft to test)— | | |
| 60 | 100 | 123 | 129 | 136 | 114 |
| 90 | 100 | 119 | 132 | 122 | 114 |
| Hardness (Adams)  30 | 37 | 56 | 63 | 68 | 68 |
| 60 | 28 | 44 | 50 | 54 | 54 |
| 90 | 26 | 40 | 44 | 48 | 49 |
| Tensile strength (lbs./sq. in.)  30 | 4112 | 2836 | 2216 | 1883 | 2060 |
| 60 | 4915 | 3727 | 2960 | 2788 | 2387 |
| 90 | 4475 | 3906 | 3201 | 2968 | 2636 |
| Ultimate elongation, %  30 | 660 | 520 | 450 | 440 | 440 |
| 60 | 660 | 510 | 430 | 420 | 390 |
| 90 | 600 | 520 | 430 | 390 | 390 |

The physical properties of the vulcanizates are compared in the following table, as well as the resistivity of the high-temperature heated samples of unvulcanized master batch before and after re-milling.

It is seen that with increased time of hot-milling, the resistivity quickly reaches a value above $10^{12}$ ohm-centimeters, the torsional hysteresis approaches asymptotically a minimum value close to that of a pure-gum compound, and

| Temp. of heating | None (conventional) | 316° F. (158° C.) | | | | 338° F. (170° C.) | | |
|---|---|---|---|---|---|---|---|---|
| Time of heating (min.) |  | 15 | 30 | 45 | 60 | 15 | 30 | 60 |
| Log of resistivity: |  |  |  |  |  |  |  |  |
| Heated master batch | 9.0 |  |  |  |  |  |  |  |
| Before remilling |  | 6.9 | 6.8 | 6.7 | 6.7 | 6.8 | 6.7 | 6.6 |
| After remilling |  | 12.0 | 11.7 | 11.8 | >12.0 | 12.0 | 11.6 | 11.9 |
| Cured | 6.0 | 8.6 | 10.0 | 11.5 | 12.0 | 10.6 | 11.4 | 12.0 |
| Abrasion resistance: |  |  |  |  |  |  |  |  |
| Low speed test | 100 | 113 | 121 | 119 | 119 | 112 | 112 | 118 |
| High speed test | 100 | 106 | 107 | 113 | 115 | 110 | 113 | 115 |
| Hardness (Adams) | 37 | 41 | 40 | 42 | 46 | 43 | 44 | 44 |
| Torsional hysteresis | .130 | .082 | .076 | .072 | .066 | .072 | .072 | .058 |
| Tensile (lbs./sq. in.) | 4043 | 3639 | 3903 | 3676 | 3500 |  |  |  |
| Elongation, ultimate (%) | 620 | 590 | 620 | 600 | 570 |  |  |  |

It is seen that the results obtained by the heater method are similar to those obtained by the hot-milling method as in Example 1.

*Example 3.*—Effect of varying the length of hot-milling period:

A master batch comprising, by weight, 100 parts of rubber and 45 parts of carbon black, was mixed in the conventional way. Different portions of this batch were hot-milled for periods of 30, 60, 90 and 120 minutes at temperatures above 300° F., and were then smoothed out or recovered by a short milling on a cool mill. Plasticity was measured before and after this recovery, by the the tensile strength, ultimate elongation, and actual hardness decrease progressively, while the abrasion resistance goes through a maximum at one hour's heating.

*Example 4.*—Effect of increased amounts of carbon black:

Three master batches were prepared in the conventional manner containing 45, 55 and 65 parts of carbon black (by weight), respectively, per 100 parts of rubber. One half of each master batch was then subjected to high-temperature milling for 30 minutes, the temperature of the mill rolls at the beginning of the period being between 300° and about 325° F., and the temperature of the batches reaching 350 to 370° F., by the end of the period. The six batches (three treated, three untreated) were then compounded by admixture of the following ingredients (parts per 100 parts of rubber, by weight):

| | |
|---|---|
| Pine tar | 5 |
| Palm oil | 1 |
| Zinc soaps of cocoanut oil acids | 3 |
| Zinc oxide | 2 |
| Acetone-diphenylamine condensate | 1 |
| Butyraldehyde-methylene-aniline condensate | 0.75 |
| Sulfur | 3.50 |

Cures were made at 293° F. The properties of the raw and cured stocks are as follows:

| Treatment | | Conventional | | | H. T. M. | | |
|---|---|---|---|---|---|---|---|
| Carbon black per 100 of rubber | | 45 | 55 | 65 | 45 | 55 | 65 |
| Plasticity of black master batch | | 110.5 | 134 | 160 | 45 | 54 | 61 |
| Log R of black master batch | | 11.2 | 9.6 | 9.0 | >12 | >12 | >12 |
| Log R of complete mix, uncured | | >12.0 | 11.4 | 11.1 | >12 | >12 | >12 |
| *Vulcanizates* | *Cure* | | | | | | |
| Log R | 60' | 8.3 | 7.5 | 8.2 | >12 | >12 | >12 |
| | 90' | 8.0 | 7.3 | 7.6 | >12 | >12 | >12 |
| Torsional hysteresis at 280° F | 90' | .149 | .178 | .220 | .053 | .066 | .082 |
| Abrasion resistance (low speed) | 60' | 100 | 95 | 85 | 118 | 118 | 103 |
| | 90' | 100 | 100 | 91 | 133 | 133 | 113 |
| Hardness (Adams) | 60' | 33 | 27 | 25 | 45 | 41 | 37 |
| | 90' | 32 | 24 | 22 | 47 | 42 | 37 |
| Tensile (lbs./sq.in.) | 60' | 4103 | 3743 | 3345 | 3860 | 3335 | 2657 |
| | 90' | 3933 | 3482 | 3531 | 3135 | 3140 | 2511 |
| Ultimate alongation (%) | 60' | 650 | 620 | 560 | 490 | 430 | 370 |
| | 90' | 640 | 570 | 550 | 460 | 430 | 350 |

The above data show that the improvements in physical properties characteristic of the invention are retained when the proportion of carbon black is increased to amounts substantially higher than those of ordinary tread stocks. Stocks containing more than 50% of carbon black on the rubber content, ordinarily too hard for factory processing without the addition of deleterious amounts of softeners, are given a normal plasticity and hardness by the process of the invention. The lower tensile strength and abrasion resistance of the 65%-black stocks in the above example are due largely to an undercured state resulting from the increased retarding effect of the higher amount of black, and would be remedied by the use of more sulfur and/or accelerator.

*Example 5.*—A tread stock using a thiuram type of organic accelerator, namely, tetramethyl thiuram disulphide, in which the carbon black master batch had been high temperature milled for 30 minutes at 300° F., when compared with a similar stock that had been prepared in the usual manner, both stocks being cured at 20 pounds per sq. in. steam pressure, gave the following results:—

| | Cure in minutes | Conventional method | H. T. M. method |
|---|---|---|---|
| Log₁₀ of resistivity of final mix. (uncured) | | 10.2 | >12 |
| Log₁₀ of resistivity of cured stocks | 30 | 7.1 | >12 |
| | 60 | 6.9 | >12 |
| | 90 | 6.6 | >12 |
| Torsional hysteresis at 280° F | 90 | .135 | .057 |
| Abrasion resistance (low speed test) | 30 | 100 | 140 |
| | 60 | 100 | 125 |
| | 90 | 100 | 123 |
| Abrasion resistance (high speed) | 30 | 100 | 127 |
| | 60 | 100 | 120 |
| | 90 | 100 | 123 |
| Hardness (Adams) | 30 | 30 | 44 |
| | 60 | 29 | 40 |
| | 90 | 30 | 39 |

The abrasion resistances of the conventional samples in the above Examples 1–5 is assigned a value of 100, values higher than 100 denoting correspondingly higher abrasion resistance.

Electrical resistivity was determined by measuring the resistance of a specimen of known thickness (about 0.1 inch) placed between mercury electrodes, under a potential difference of 135 volts, using a sensitive galvanometer with an Ayrton shunt.

The torsional hysteresis ($K_{280° F.}$) represents the logarithmic decrement (base 10) of the observed amplitudes of successive oscillations of a torsion pendulum, measured at 280° F. (137.8° C.) with an apparatus consisting essentially of a torsion pendulum in which the sample of rubber tested supplies the restoring force when the pendulum is deflected. For example, a dumbbell test piece of rubber may be gripped at either end by a stationary upper clamp and a lower clamp, the latter being fixed to the hub of a horizontally disposed disc or wheel graduated in degrees. A sight is fixed adjacent to the periphery of the disc. The pendulum is set in rotary oscillation and the amplitudes of rotation read off from the scale. The apparatus is enclosed in a constant temperature oven having a glass door or window through which the observations may be made. The dimensions of the rubber test piece and the weight of the parts suspended from the test piece should be so designed that the rubber is under only a negligible elongation, such as less than 5%. The torsional hysteresis values set forth in the specification and claims refer in every instance to measurements made while the rubber is under negligible elongation. The lower the observed value of K, the lower is the hysteresis or energy loss. In terms of service, this means less heat developed during repeated stresses and hence there is a tendency toward longer life of the rubber tire. Ordinary tread stocks vulcanized by means of sulphur and the usual organic accelerators, generally give values of $K_{10}$ ranging from 0.12 to 0.30.

The abrasion resistance is expressed by figures which are inversely proportional to the amount of wear (reduction in thickness) effected during a fixed number of cycles on the United States Rubber Company abrasion testing machine. In the "low speed" test the machine is operated with the abrasive wheel rotating at 180 R. P. M. and with a total load on the sample of 6 lbs., while in the "high speed" test the speed is 1130 R. P. M. and the total load 4 lbs.

The "permanent set" is determined by measuring the distance between bench marks on a dumbbell tensile test piece one minute after rupture.

In carrying out the invention the usual softeners may be included, if desired, in the initial mixture of rubber and black according to common practice for the purpose of softening the rubber and facilitating the admixture and distribution of the black therein,—for example, such softeners as oils, tars, fatty acids, fatty acid soaps, mineral rubber, and reclaimed rubber. The invention is also applicable to rubber and black mixtures comprising crude rubber which has been pre-softened or plasticized by such known special methods as heating in air, steam, or mixtures thereof, or mastication in the presence of ozone, lead dioxide, lead sesquioxide, or other types of plasticizing agents. Furthermore, the invention is applicable to mixtures of rubber and black with which vulcanizing ingredients, including any part or all of the sulfur required for vulcanization, have been incorporated prior to the carrying out of the novel heating and milling process; in this case, however, care must be taken to ensure that the mixture does not become scorched or pre-vulcanized to such an extent that it cannot be re-plasticized to permit calendering or extruding. Furthermore while sulphur is generally used as the vulcanizing agent, other known vulcanizing agents such as the thiuram polysulfides, e. g. tetramethyl thiuramdisulphide, may be used within the broad scope of the invention, and the process may be modified to accommodate such materials.

Improved dispersion and resistivity are also obtained when rubber-and-black mixtures treated according to the invention are vulcanized to hard rubber (ebonite). For example, mixtures of 100 parts of rubber and 45 parts of carbon black—one of them treated conventionally, the other mixed conventionally and then milled for 30 minutes at 300° to 340° F. and recovered—were each compounded with 45 parts of sulfur and vulcanized for four hours at 298° F. The resistivities of the resulting ebonites were $10^{8.7}$ ohm-centimeters for the conventional stock, and greater than $10^{12}$ ohm-centimeters for the H. T. M. stock.

Whereas the invention is adaptable broadly to all kinds of black, it is particularly concerned with what are known as rubber reinforcing blacks, which blacks are herein distinguishable from the so called "soft" rubber blacks, which are non-reinforcing and substantially non-flocculable by heat, and from blacks like paint black and ink black which interfere with the production of well cured vulcanizates due to their very pronounced inhibiting effect on vulcanization. Wherever the term "carbon black" occurs, it is to be understood as meaning a reinforcing rubber black manufactured by any process and more particularly by the partial combustion of natural gas and having a relatively high degree of subdivision.

While the invention is particularly significant in relation to tire tread compositions, it is also applicable to the manufacture of any rubber products in which are desired the qualities of high abrasion resistance, toughness, flexibility, high electrical resistivity, or low hysteresis, etc., such as footwear outsoles, pneumatic inner tubes, hose, belting, vibration-absorbing mountings, tank linings, ball mill linings, chute linings, paving blocks, outer sheathing for electrical conductors, etc.

For example, whereas heretofore tire tread blacks such as channel black have generally not been unsable in shoe soling compounds because of resulting undesired hardness in the uncured and cured stocks, the present invention provides not only a means for using such a black in place of the usual soft black, to give a soft, easily calenderable stock, but also provides soling having two to three times the abrasion resistance of the soft-black soling.

The term "rubber" is used in its usual generic sense as applicable to caoutchouc and similar vulcanizable natural gums, as well as to various synthetic rubbers and rubber-like products which are artificially prepared and which have properties in common with natural rubber whereby they may be adapted to the same commercial uses.

While certain theories and explanations have been advanced in an attempt to explain what is thought to be the mechanism of the invention, it is to be understood that the invention is not to be restricted to or be bound by the same, but is limited solely by the claims wherein it is intended to claim all novelty inherent in the invention as is permissible in view of the prior art.

Having thus described our invention what we claim and desire to protect by Letters Patent is:

1. A method of manufacturing rubber products having unusually high resistance to abrasion when vulcanized which comprises incorporating into rubber a relatively large amount of a rubber reinforcing black and mixing to a substantially homogeneous condition, subsequently severely flocculating the black in the rubber mass and masticating the mixture to bring about substantially complete particulate dispersion of the black throughout the mass without serious degradation of the rubber, completing the incorporation of vulcanizing and other desired ingredients, shaping the mass as desired and vulcanizing the rubber.

2. A method of manufacturing rubber products having unusually high resistance to abrasion when vulcanized which comprises subjecting a homogeneous mix comprising unvulcanized rubber and substantial amounts of carbon black to heat at a sufficiently high temperature and for a sufficient length of time to cause severe flocculation of the black in the rubber and masticating the so heat-treated batch until the specific electrical resistivity of the mix rises to a value of at least about $10^{12}$ ohm-centimeters without serious degradation of the rubber.

3. A method of manufacturing rubber products having unusually high resistance to abrasion when vulcanized which comprises incorporating into rubber a relatively large amount of a rubber reinforcing black and mixing to a substantially homogeneous condition, subsequently causing a severe flocculation of the black in the rubber mass by subjecting the mass to a heat treatment at a temperature at least substantially above 250° F. and masticating the mixture to bring about substantially complete particulate dispersion of the black throughout the mass without serious degradation of the rubber, completing incorporation of vulcanizing and other desired ingredients, shaping the mass as desired and vulcanizing the rubber.

4. A process of producing a vulcanized rubber product having an unusually high resistance to abrasion which comprises in addition to the conventional steps of plasticizing and mixing a rubber batch to which has been added a relatively large amount of a rubber reinforcing black, the steps of heating the rubber mix when it is substantially homogeneous, at a temperature above 300° F. and milling the so heat-treated stock to a smooth, plastic consistency suitable for the incorporation of additional compounding and vulcanizing ingredients without serious degradation of the rubber.

5. A process of producing a vulcanized rubber product having an unusually high resistance to abrasion which comprises in addition to the conventional steps of plasticizing and mixing a rubber batch to which has been added a relatively large amount of a rubber reinforcing black, the steps of heating the rubber mix when it is substantially homogeneous, in a heater at a temperature above 300° F. and then milling the so heat-treated stock to a smooth, plastic consistency suitable for the incorporation of additional compounding and vulcanizing ingredients without serious degradation of the rubber.

6. A process of producing a vulcanized rubber product having an unusually high resistance to abrasion which comprises in addition to the conventional steps of plasticizing and mixing a rubber batch to which has been added a relatively large amount of a rubber reinforcing black, the steps of heating the homogeneous rubber mix to a sufficiently high temperature to render the surface of the mix rough and dull in appearance and milling the so heat-treated stock to a smooth plastic consistency suitable for the incorporation of additional compounding and vulcanizing ingredients without serious degradation of the rubber.

7. A process of producing a vulcanized rubber product having an unusually high resistance to abrasion which comprises in addition to the conventional steps of plasticizing and mixing a rubber batch to which has been added a relatively large amount of a rubber reinforcing black, the steps of heating and masticating the homogeneous mix at a sufficiently high temperature and for a sufficient length of time to produce first a decrease in the specific electrical resistivity by a factor on the order of at least 1000 followed by an increase in the specific electrical resistivity by a factor on the order of at least 1,000,000 without serious degradation of the rubber.

8. A method of processing a tire tread stock preliminary to the usual shaping and vulcanizing operations which comprises incorporating and working into a rubber composition, a relatively large amount of carbon black until the rubber mass has attained a smooth, glossy and homogeneous appearance, subjecting the homogeneous rubber mix to a heat treatment within a temperature range of from about 300° F. to about 370° F. and milling the so heat-treated mass to a smooth, plastic consistency suitable for the incorporation of compounding ingredients without serious degradation of the rubber, and completing the incorporation of vulcanizing and other desired ingredients prior to the final shaping and vulcanization of the rubber stock.

9. A method of processing a tire tread stock preliminary to the usual shaping and vulcanizing operations which comprises incorporating and working into a rubber composition, a relatively large amount of carbon black until the mass has attained a smooth, glossy and homogeneous appearance, hot milling the homogeneous rubber mix within a temperature range of from about 300° F. to about 370° F. for about 10 to 60 minutes and milling the so heat-treated mass to a smooth, plastic consistency suitable for the incorporation of compounding ingredients without serious degradation of the rubber, and completing incorporation of vulcanizing and other desired ingredients prior to the final shaping and vulcanization of the rubber stock.

10. A process of producing a vulcanized rubber product having an unusually high resistance to abrasion which comprises incorporating and working into a rubber composition a relatively large amount of carbon black until the rubber mass has attained a smooth, glossy, and homogeneous appearance, subjecting the homogeneous rubber mix while substantially free of metallic oxide, vulcanizing and accelerating ingredients, to a heat treatment within a temperature range of from about 300° F. to about 370° F. for from 10 to about 60 minutes, and milling the so heat-treated mass to a smooth plastic consistency suitable for the incorporation of additional compounding ingredients, and completing the incorporation of vulcanizing and other desired ingredients prior to the final shaping and vulcanization of the rubber stock.

11. As a new article of manufacture, a rubber product comprising the vulcanization product of a rubber mix comprising rubber, sulphur and at least 25 parts by weight of a rubber reinforcing black per 100 parts by weight of rubber in which the reinforcing black is in a substantially complete particulate state of dispersion in the rubber resulting from severely flocculating the black while homogeneously mixed in the rubber and masticating the mixture to bring about substantially complete dispersion of the black and which vulcanization product has a torsional hysteresis value not exceeding 0.06 at 280° F.

12. As a new article of manufacture, a rubber product comprising the vulcanization product of a rubber mix comprising rubber, sulphur, and at least 40 parts by weight of carbon black per 100 parts by weight of rubber in which the reinforcing black is in a substantially complete particulate state of dispersion in the rubber resulting from severely flocculating the black while homogeneously mixed in the rubber and masticating the mixture to bring about substantially complete dispersion of the black and which vulcanization product has a torsional hysteresis value of less than 0.08 at 280° F.

13. As a new article of manufacture, a rubber product comprising the vulcanization product of a rubber mix comprising rubber, sulphur, and at least 40 parts by weight of carbon black per 100 parts by weight of rubber in which the reinforcing black is in a substantially complete particulate state of dispersion in the rubber resulting from severely flocculating the black while homogeneously mixed in the rubber and masticating the mixture to bring about substantially complete dispersion of the black and which vulcanization product has a torsional hysteresis value not exceeding 0.06 at 280° F.

14. As an article of manufacture, a rubber product comprising the vulcanization product of a rubber mix comprising rubber, sulphur, and at least 25 percent by weight based on the rubber of a rubber reinforcing black in which the reinforcing black is in a substantially complete particulate state of dispersion in the rubber resulting from severely flocculating the black while homogeneously mixed in the rubber and masticating the mixture to bring about substantially complete dispersion of the black, and which vulcanization product has a torsional hysteresis value not exceeding 0.06 at 280° F. and a specific electrical resistivity equal to at least $10^{12}$ ohm-centimeters.

15. As a new article of manufacture, a rubber product comprising the vulcanization product of a rubber mix comprising rubber, sulphur, and at least 40 parts by weight of carbon black per 100 parts by weight of rubber in which the reinforcing black is in a substantially complete particulate state of dispersion in the rubber resulting from severely flocculating the black while homogeneously mixed in the rubber and masticating the mixture to bring about substantially complete dispersion of the black and which vulcanization product has a torsional hysteresis value not exceeding 0.06 at 280° F. and a specific electrical resistivity equal at least $10^{12}$ ohm-centimeters.

16. As a new article of manufacture a rubber product comprising a vulcanized rubber composition of improved abrasion characteristics containing at least 40 parts by weight of a rubber reinforcing black per 100 parts by weight of rubber in which the reinforcing black is in a substantially complete particulate state of dispersion in the rubber resulting from severely flocculating the black while homogeneously mixed in the rubber and masticating the mixture to bring about substantially complete dispersion of the black and which product is characterized in having a specific electrical resistivity of at least $10^{12}$ ohm-centimeters and a torsional hysteresis value of less than 0.06 at 280° F.

17. As a new article of manufacture a tire having a vulcanized tread portion of improved abrasion characteristics comprising at least 40 parts by weight of a rubber reinforcing black per 100 parts by weight of rubber in which the reinforcing black is in a substantially complete particulate state of dispersion in the rubber resulting from severely flocculating the black while homogeneously mixed in the rubber and masticating the mixture to bring about substantially complete dispersion of the black and which tread portion is further characterized in having a specific electrical resistivity of at least $10^{12}$ ohm-centimeters and a torsional hysteresis value of less than 0.06 at 280° F.

18. A sulfur-rubber vulcanizate containing a relatively large proportion of normally heat-flocculable carbon black in a highly deflocculated and particulate state of dispersion resulting from a process as set forth in claim 1.

19. A rubber composition comprising at least 40% by weight of carbon black based on the rubber content resulting from the process as set forth in claim 3 and having in both the unvulcanized and the vulcanized states a specific electrical resistivity equal to at least $10^{12}$ ohm-centimeters, said carbon black being of a type which in such proportion in vulcanized rubber normally permits in the vulcanized composition a specific electrical resistivity of not more than about $10^9$ ohm-centimeters.

20. As a new article of manufacture, a rubber product having an unusually high resistance to abrasion resulting from the process as set forth in claim 5, said product having a torsional hysteresis value not exceeding 0.08 at 280° F.

ROSCOE H. GERKE.
GEORGE H. GANZHORN.
LOUIS H. HOWLAND.
HUGH M. SMALLWOOD.

DISCLAIMER 2,118,601.—*Roscoe H. Gerke,* Nutley, *George H. Ganzhorn,* West Englewood, *Louis H. Howland,* Nutley, N. J., and *Hugh M. Smallwood,* New York, N. Y. MANUFACTURE OF RUBBER. Patent dated May 24, 1938. Disclaimer filed December 13, 1940, by the assignee, *United States Rubber Company.*
Hereby enters this disclaimer to claims 4 and 5 of said patent.
[*Official Gazette January 21, 1941.*]

product comprising the vulcanization product of a rubber mix comprising rubber, sulphur, and at least 40 parts by weight of carbon black per 100 parts by weight of rubber in which the reinforcing black is in a substantially complete particulate state of dispersion in the rubber resulting from severely flocculating the black while homogeneously mixed in the rubber and masticating the mixture to bring about substantially complete dispersion of the black and which vulcanization product has a torsional hysteresis value not exceeding 0.06 at 280° F. and a specific electrical resistivity equal at least $10^{12}$ ohm-centimeters.

16. As a new article of manufacture a rubber product comprising a vulcanized rubber composition of improved abrasion characteristics containing at least 40 parts by weight of a rubber reinforcing black per 100 parts by weight of rubber in which the reinforcing black is in a substantially complete particulate state of dispersion in the rubber resulting from severely flocculating the black while homogeneously mixed in the rubber and masticating the mixture to bring about substantially complete dispersion of the black and which product is characterized in having a specific electrical resistivity of at least $10^{12}$ ohm-centimeters and a torsional hysteresis value of less than 0.06 at 280° F.

17. As a new article of manufacture a tire having a vulcanized tread portion of improved abrasion characteristics comprising at least 40 parts by weight of a rubber reinforcing black per 100 parts by weight of rubber in which the reinforcing black is in a substantially complete particulate state of dispersion in the rubber resulting from severely flocculating the black while homogeneously mixed in the rubber and masticating the mixture to bring about substantially complete dispersion of the black and which tread portion is further characterized in having a specific electrical resistivity of at least $10^{12}$ ohm-centimeters and a torsional hysteresis value of less than 0.06 at 280° F.

18. A sulfur-rubber vulcanizate containing a relatively large proportion of normally heat-flocculable carbon black in a highly deflocculated and particulate state of dispersion resulting from a process as set forth in claim 1.

19. A rubber composition comprising at least 40% by weight of carbon black based on the rubber content resulting from the process as set forth in claim 3 and having in both the unvulcanized and the vulcanized states a specific electrical resistivity equal to at least $10^{12}$ ohm-centimeters, said carbon black being of a type which in such proportion in vulcanized rubber normally permits in the vulcanized composition a specific electrical resistivity of not more than about $10^9$ ohm-centimeters.

20. As a new article of manufacture, a rubber product having an unusually high resistance to abrasion resulting from the process as set forth in claim 5, said product having a torsional hysteresis value not exceeding 0.08 at 280° F.

ROSCOE H. GERKE.
GEORGE H. GANZHORN.
LOUIS H. HOWLAND.
HUGH M. SMALLWOOD.

DISCLAIMER 2,118,601.—*Roscoe H. Gerke,* Nutley, *George H. Ganzhorn,* West Englewood, *Louis H. Howland,* Nutley, N. J., and *Hugh M. Smallwood,* New York, N. Y. MANUFACTURE OF RUBBER. Patent dated May 24, 1938. Disclaimer filed December 13, 1940, by the assignee, *United States Rubber Company.*
Hereby enters this disclaimer to claims 4 and 5 of said patent.
[*Official Gazette January 21, 1941.*]

DISCLAIMER

2,118,601.—*Roscoe H. Gerke*, Nutley, *George H. Ganzhorn*, West Englewood, *Louis H. Howland*, Nutley, N. J., and *Hugh M. Smallwood*, New York, N. Y. MANUFACTURE OF RUBBER. Patent dated May 24, 1938. Disclaimer filed December 13, 1940, by the assignee, *United States Rubber Company*.
Hereby enters this disclaimer to claims 4 and 5 of said patent.
[*Official Gazette January 21, 1941.*]